US 6,526,096 B2

(12) United States Patent
Lainema et al.

(10) Patent No.: US 6,526,096 B2
(45) Date of Patent: *Feb. 25, 2003

(54) VIDEO CODING SYSTEM FOR ESTIMATING A MOTION VECTOR FIELD BY USING A SERIES OF MOTION ESTIMATORS OF VARYING COMPLEXITY

(75) Inventors: Jani Lainema, Tampere (FI); Marta Karczewicz, Tampere (FI); Levent Oktem, Tampere (FI)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,307

(22) Filed: Sep. 19, 1997

(65) Prior Publication Data
US 2002/0057741 A1 May 16, 2002

(30) Foreign Application Priority Data
Sep. 20, 1996 (GB) ............................................. 9619679

(51) Int. Cl.[7] ................................................. H04N 7/12
(52) U.S. Cl. ................................................. 375/240.16
(58) Field of Search ....................... 375/240.01, 240.02, 375/240.12, 240.16, 240.22; H04N 7/12

(56) References Cited

U.S. PATENT DOCUMENTS

| 5,194,950 A | 3/1993 | Murakami et al. ............ 358/133 |
| 5,392,282 A | 2/1995 | Kiema .......................... 370/77 |
| 5,412,435 A | 5/1995 | Nakajima ..................... 348/699 |
| 5,444,489 A * | 8/1995 | Truong et al. .......... 375/240.22 |
| 5,453,799 A | 9/1995 | Yang et al. .................. 348/699 |

FOREIGN PATENT DOCUMENTS

WO  WO 93/07585  4/1993

OTHER PUBLICATIONS

Nonrigid Motion Tracking XP–002050741, pp. 658–667.
Hierarchical Model–Based Motion Estimation XP–002050742, pp. 237–252.
Temporal Redundancy Reduction Using A Motion Model Hierarchy and Tracking for Image Sequence Coding XP–002050743; 10 pages.
Compact Motion Representation Based on Global Features for Semantic Image Sequence Coding; pp. 697–708.
Transactions Brief; pp. 357–364.
International Search Report dated Dec. 18, 1997.
"Representation of motion information for image coding", in Proceedings of the 1990 Picture Coding Symposium, Nguyen et al., Mar. 1990, pp. 8.4–1 to 8.4–5.

(List continued on next page.)

Primary Examiner—Young Lee
(74) Attorney, Agent, or Firm—Perman & Green, LLP (57) ABSTRACT

A motion estimation system for a video coder has an input for a video image to be coded, and includes a series of motion estimators of varying complexity for estimating a motion vector field between a received image and a reference image. The estimation is accomplished by sequential use of the estimators, wherein a subsequent estimator of the sequence is selected by a controller based on a prediction error, associated with the motion vector field estimated by a currently selected estimator, exceeding a predetermined threshold.

17 Claims, 6 Drawing Sheets

OTHER PUBLICATIONS

"Segmentation Algorithm by Multicriteria Region Merging", B. Marcotegui, Centre de Morphologie Mathematique.

"Region–based motion estimation using deterministic relaxation schemes for image sequence coding", Nicolas et al., pp. III–265–268.

"Motion Compensation Using Second–Order Geometric Transformations", Papadoupoulos et al., IEEE Transaction on Circuits and Systems for Video Technology, vol. 5, No. 4, Aug. 1995, pp. 319–331.

"Efficient Region–Based Motion Estimation And Symmetry Oriented Segmentation For Image Sequence Coding", IEEE Transactions on Circuits and Systems for Video Technology, vol. 4, No. 3, Jun. 1994, pp. 357–364.

"The Pyramid as a Structure for Efficient Computation", Multiresolution Image Processing and Analysis, P.J. Burt, 1984, pp. 6–35.

"Practical Methods of Optimization", $2^{nd}$ Edition, J. Wiley & Sons, 1987, Chapters 3 & 6.

"Numerical Recipes in C", Teukolsky et al., $2^{nd}$ Edition, Cambridge University Press, 1992, pp. 96–98.

* cited by examiner

Fig.3(a).
Block based motion compensation

Fig.3(b).
Segmentation based motion compensation

VIDEO CODING SYSTEM FOR ESTIMATING A MOTION VECTOR FIELD BY USING A SERIES OF MOTION ESTIMATORS OF VARYING COMPLEXITY

FIELD OF INVENTION

The present invention relates to a video coding system. In particular, it relates to a system for the compression of video sequences using motion compensated prediction.

BACKGROUND OF THE INVENTION

Figure 1:
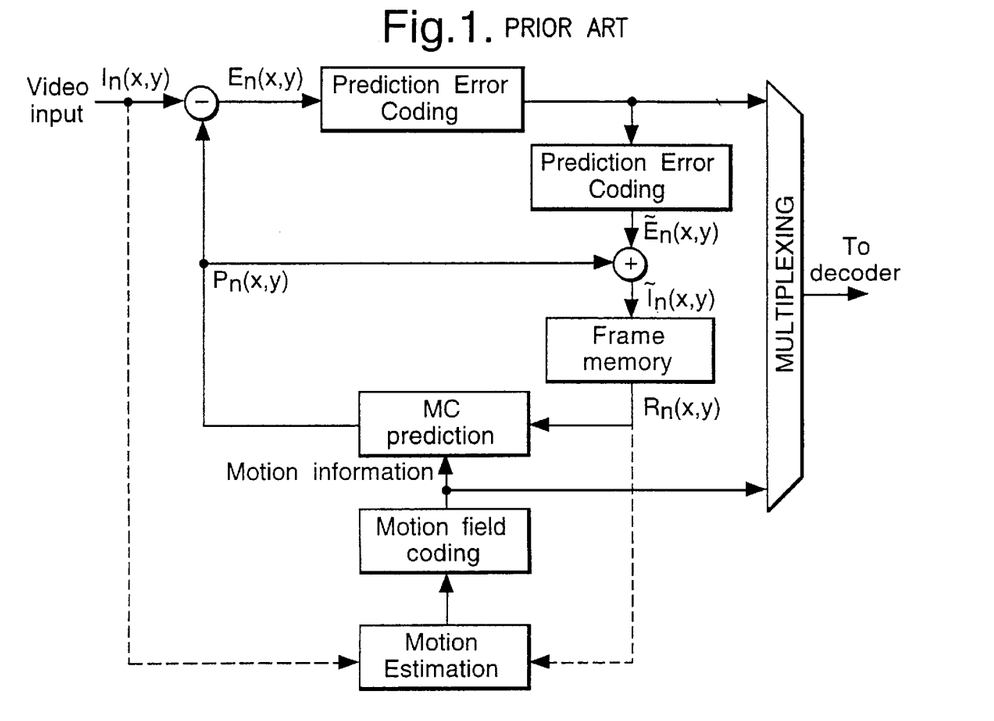
FIG. 1 illustrates an encoder for the motion compensated coding of video.
Figure 2:
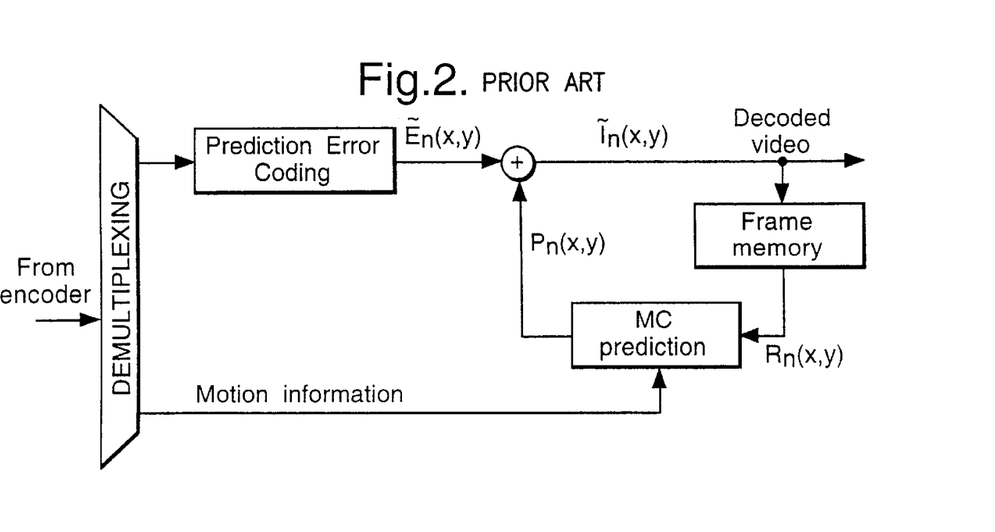
FIG. 2 illustrates a decoder for the motion compensated coding of video.

The schematic diagram of a system using motion compensated prediction is shown in FIG. 1 and FIG. 2 of the accompanying drawings. FIG. 1 illustrates an encoder having a motion estimation block and FIG. 2 illustrates a corresponding decoder. Motion compensated prediction in such a system is outlined below.

In typical video sequences the change of the content of successive frames is to a great extent the result of the motion in the scene. This motion may be due to camera motion or due to motion of the objects depicted in the scene. Therefore typical video sequences are characterized by significant temporal correlation, which is highest along the trajectory of the motion. Efficient compression of video sequences requires exploitation of this property of video sequences.

Motion Compensated (MC) prediction is a widely recognized technique for compression of video. It utilizes the fact that in typical video sequence, image intensity value in a particular frame can be predicted using image intensities of some other already coded and transmitted frame, given motion trajectory between these two frames.

The operating principle of motion compensated video coders is to minimize the prediction error $E_n(x,y)$, i.e., the difference between the frame being coded $I_n(x,y)$ called the current frame and the prediction frame $P_n(x,y)$ (FIG. 1):

$$E_n(x,y)=I_n(x,y)-P_n(x,y) \quad (1)$$

The prediction error $E_n(x,y)$ is compressed and the compression process typically introduces some loss of information. The compressed prediction error denoted $\overline{E}_n(x,y)$ is sent to the decoder. Prediction frame $P_n(x,y)$ is constructed by the motion compensated prediction block in FIG. 1 and FIG. 2. The prediction frame is built using pixel values of the reference frame denoted $R_n(x,y)$ and the motion vectors of pixels between the current frame and the reference frame using formula $$P_n(x,y)=R_n[x+\Delta x(x,y), y+\Delta y(x,y)]. \quad (2)$$

Reference frame is one of previously coded and transmitted frames (e.g. frame preceding the one being coded) which at a given instant is available in the Frame Memory of the encoder and of the decoder. The pair of numbers [$\Delta x(x,y)$, $\Delta y(x,y)$] is called the motion vector of the pixel in location (x,y) in the current frame. $\Delta x(x,y)$ and $\Delta y(x,y)$ are the values of horizontal and vertical displacements of this pixel, respectively. Motion vectors are calculated by the motion estimation block in the encoder shown in FIG. 1. The set of motion vectors of all pixels of the current frame [$\Delta x(\cdot)$, $\Delta y(\cdot)$] is called motion vector field and is transmitted to the decoder.

In the decoder, pixels of the coded current frame $\tilde{I}_n(x,y)$ are reconstructed by finding the prediction pixels in the reference frame $R_n(\cdot)$ using the received motion vectors and by adding the received prediction error $\overline{E}_n(x,y)$, i.e., $$\tilde{I}_n(x,y)=R_n[x+\Delta x(x,y),y+\Delta y(x,y)]+\overline{E}_n(x,y) \quad (3)$$

For example, if the transmission channel available for the compressed video bit stream is very narrow, it is possible to reject the effect of prediction errors. Then it is not necessary to compress and transmit the prediction error, and the spare bits from the transmission channel and spare calculation power can be used for other purposes, e.g., to improve the frame rate of the video signal. The rejection of prediction errors leads to defective pixel elements in the visible video picture, but depending on the demands of the application in use it may be acceptable.

Figure 3A:
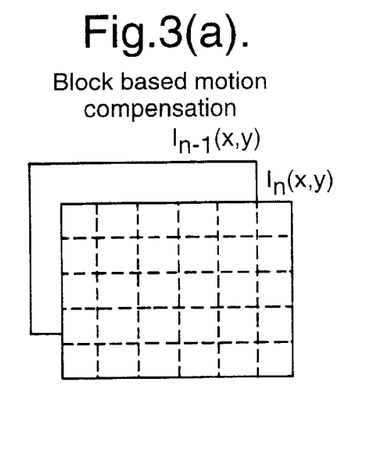
FIG. 3(a) illustrates the division of the current frame for block based motion compensation.
Figure 3B:
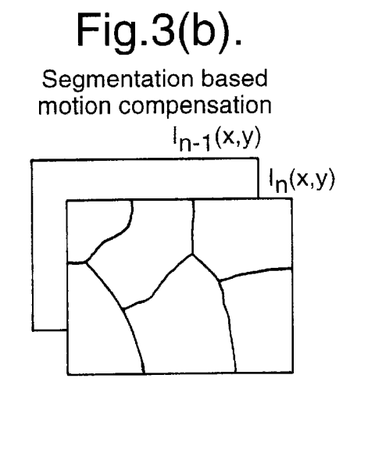
FIG. 3(b) illustrates the division of the current frame for segmentation based motion compensation.

Due to the very large number of pixels in the frame it is not efficient to transmit a separate motion vector for each pixel. Instead, in most video coding schemes the current frame is divided into larger image segments so that all motion vectors of the segment can be described by few coefficients. Depending on the way the current frame is divided into the segments two types of motion compensated coders can be distinguished:

1 Block based coders where the current frame is divided into fixed and a priori known blocks, e.g., 16×16 pixels blocks in international standard ISO/IEC MPEG-1 or ITU-T H.261 codecs (FIG. 3a).
2 Segmentation based (region based) coders where the current frame is divided into arbitrarily shaped segments, e.g., obtained by a segmentation algorithm (FIG. 3b). (For examples refer to Centre de Morphologie Mathematique (CMM), "Segmentation algorithm by multicriteria region merging," Document SIM(95)19, COST 211ter Project Meeting, May 1995 and P. Cicconi and H. Nicolas, "Efficient region-based motion estimation and symmetry oriented segmentation for image sequence coding," *IEEE Transactions on Circuits and Systems for Video Technology*, Vol. 4, No. 3, June 1994, pp. 357–364)

In practice segments include at least few tens of pixels. In order to represent the motion vectors of these pixels compactly it is desirable that their values are described by a function of few coefficients. Such function is called motion vector field model.

Motion compensated video coding schemes may define the motion vectors of image segments by the following general formula:

$$\Delta x(x, y) = \sum_{i=0}^{N-1} a_i f_i(x, y) \quad (4)$$

$$\Delta y(x, y) = \sum_{i=0}^{M-1} b_i g_i(x, y) \quad (5)$$

where coefficients $a_i$ and $b_i$ are called motion coefficients and are transmitted to the decoder. Functions $f_i$ and $g_i$ are called motion field basis functions and have to be known both to the encoder and decoder.

Polynomial motion models are a widely used family of models. (See, for example H. Nguyen and E. Dubois, "Representation of motion information for image coding," in *Proc. Picture Coding Symposium '90*, Cambridge, Mass., Mar. 26–18, 1990, pp. 841–845 and Centre de Morphologie Mathematique (CMM), "Segmentation algorithm by multicriteria region merging," Document SIM(95)19, COST 211ter Project Meeting, May 1995). The values of motion vectors are described by functions which are linear combinations of 2D polynomial functions, the translational motion model is the simplest model and requires only two coefficients to describe motion vectors of each segment. The values of motion vectors are given by formula $$\Delta x(x,y)=a_0$$
$$\Delta y(x,y)=b_0 \quad (6)$$

This model is used in international standards (ISO MPEG-1, ITU-T Recommendation H.261) to describe motion of fixed 16×16 blocks. Two other widely used models are affine motion model given by the equation:

$$\Delta x(x,y) = a_0 + a_1 x + a_2 y$$
$$\Delta y(x,y) = b_0 + b_1 x + b_2 y \qquad (7)$$

and quadratic motion model given by the equation:

$$\Delta x(x,y) = a_0 + a_1 x + a_2 y + a_3 xy + a_4 x^2 + a_5 y^2$$
$$\Delta y(x,y) = b_0 + b_1 x + b_2 y + b_3 xy + b_4 x^2 + b_5 y^2 \qquad (8)$$

The Motion Estimation block calculates motion vectors $[\Delta x(x,y), \Delta y(x,y)]$ of the pixels of a given segment $S_k$ which minimize some measure of prediction error in this segment. A meaningful additive measure of prediction error has the form $$\sum_{(x_i, y_i) \in S_k} p_i h(|I_n(x, y) - R_n(x + \Delta x(x, y), y + \Delta y(x, y))|) \qquad (9)$$

where $p_i$'s are scalar constants, $|.|$ denotes absolute value, and h is a non-decreasing function. A very popular measure is the square prediction error, in which case $p_i = 1$, and $h(.) = (.)^2$:

$$\sum_{(x_i, y_i) \in S_k} (I_n(x, y) - R_n(x + \Delta x(x, y), y + \Delta y(x, y)))^2 \qquad (10)$$

The function to minimize (9) is highly nonlinear and there is thus no practical technique which is capable of always finding the absolute minimum of (9) in finite time. Accordingly, motion estimation techniques differ depending on the algorithm for minimization of the chosen measure of prediction error.

Previously known techniques for motion estimation are discussed below.

One technique is the full search. In this technique the value of the cost function is calculated for all the possible combinations of allowed values of the motion coefficients (restricted by the range and precision with which motion coefficients can be represented). The values of motion coefficients for which the cost function is minimized are chosen to represent the motion vector field.

The full search technique is usually used only to estimate motion coefficients of translational motion model and cannot be straightforwardly generalized for other motion models, due to computational burden. In a straight forward generalization, the computational complexity of the algorithm is exponentially increased by the number of motion coefficients used to represent the motion vector field.

Motion estimation using Gauss-newton iterations (or differential optimization schemes) is an alternative. These are outlined in H. Sanson, "Region based motion estimation and compensation for digital TV sequence coding," in *Proc. Picture Coding Symposium x93*, Lausanne, Switzerland. Mar. 17–19, 1993 and C. A. Papadoupoulos, and T. G. Clarkson, "Motion Compensation Using Second-Order Geometric Transformations", *IEEE Transactions on Circuits and Systems for Video Technology*, Vol. 5, No. 4, August 1995, pp. 319–331. Such techniques, use the well-known Gauss-Newton function minimization algorithm, to minimize the cost function (9), i.e. the chosen measure of prediction error, as a function of motion coefficients.

This algorithm assumes that the function to be minimized can be locally approximated by a quadratic function of the arguments. Then, the $n^{th}$ iteration step consists of 1. computing the approximate quadratic function using first and second derivatives of the actual function using the motion coefficient resulting from $(n-1)^{th}$ step,
2. computing the coefficient vector minimizing the approximate function, and assigning the result to the motion coefficient of $n^{th}$ step.

The main problem associated with the Gauss-Newton algorithm is that it converges only towards local minima, unless the initial motion coefficients lie in the attraction domain of the global minimum. Thus it is necessary to feed the Gauss-Newton algorithm with a sufficiently good initial guess of the actual optimum. Two different techniques are usually used to improve the convergence of the Gauss-Newton algorithm:

1. motion estimation using multiresolution image pyramids,
2. motion estimation using hierarchically increasing levels of the motion model.

The technique of motion estimation using multiresolution image pyramids is based on the assumption that low-pass filtering the current frame and the reference frame will erase the local minima and help the algorithm to converge to the global minimum. Motion estimation is performed first on the low-pass filtered (smoothed) versions of the reference and current frames, and the result is fed as input to the motion estimation stages using less smoothed images. The final estimation is performed on non-smoothed images. Some vanants of this class additionally down-sample the low-pass filtered images, to reduce the amount of computations. (For examples of this technique, see H. Sanson, "Region based motion estimation and compensation for digital TV sequence coding," in *Proc. Picture Coding Symposium '93*, Lausanne, Switzerland, Mar. 17–19, 1993 and P. J. Burt, "The Pyramid as a Structure for Efficient Computation", in: Multiresolution Image Processing and Analysis, ed. Rosenfeld, Springer Vedag, 1984, pp. 6–35).

However, low-pass filtering of the images does not necessarily erase local minima. Furthermore, this may shift the location of global minimum, Down-sampling of filtered images can cause aliasing. Moreover, convergence becomes more difficult due to the reduction of number of pixels in the region.

By contrast, the technique of motion estimation using hierarchically increasing levels of the motion model makes use of the following assumptions:

1. A complex motion model can be approximated by a lower order motion model.
2. This approximation is a good initial guess for the iterative search of more complex motion model coefficients.

The most common hierarchy is starting with the translational model (2 coefficients), then continuing with a simplified linear model (corresponding to the physical motion of translation, rotation and zoom, having 4 coefficients), and then going to the complete linear model (6 coefficients), etc. (Such hierarchy can be seen in P. Cicconi and H. Nicolas, "Efficient region-based motion estimation and symmetry oriented segmentation for image sequence coding," *IEEE Transactions on Circuits and Systems for Video Technology*, Vol. 4, No. 3. June 1994, pp. 357–364 and H. Nicolas and C. Labit, "Region-based motion estimation using deterministic relaxation schemes for image sequence coding," in *Proc. 1994 International Conference on Acoustics, Speech and Signal Processing*, pp. 111265–268.)

These assumptions can work very well under certain conditions. However, convergence to a local minimum is often a problem, especially in the case when the approximation turns out to be a poor one.

Present systems, such as those outlined above, suffer from disadvantages resulting from the relationship between computational complexity and video compression performance.

That is, on the one hand, an encoder will require a motion estimation block having high computational complexity in order to determine motion coefficients which minimize the chosen measure of prediction error (9) and thus achieve the appropriate video compression performance. Usually, in this case such a motion estimation block poses as a bottleneck for computational complexity of the overall encoder, due to the huge number of computations required to achieve the solution.

On the other hand, if computational complexity is reduced, it will result In a reduction in prediction performance, and thus video compression performance. Since the prediction performance of motion estimation heavily affects the overall compression performance of the encoder, it is crucial for a motion estimation algorithm to have high prediction performance (i.e. low prediction error) with relatively low complexity.

SUMMARY OF THE INVENTION

The aforementioned disadvantage is overcome, and other benefits are provided, by the provision of a system according to the present invention in which the encoder comprises at least two different operation modes, and the transmitter further comprises result verification means to select the operation mode of the encoding means.

To keep the complexity low, motion estimation algorithms have to make assumptions about the image data, motion, and prediction error. The more these assumptions hold statistically, and the stronger the assumptions are, the better the algorithm is. Different sets of assumptions usually result in different minimization techniques.

The system according to the present invention achieves statistically low prediction error with relatively little complexity by dynamically switching between statistically valid assumptions varying in strength.

The present invention relates to a system where a digitized video signal is transmitted from a transmitter to a receiver, said transmitter comprises encoding means to compress the video signal to be transmitted, said receiver comprises decoding means to decode the compressed video signal, said encoding means comprise at least two different operation modes, and said transmitter further comprises result verification means to select the operation mode of said encoding means.

The present invention further relates to a corresponding system where the encoding means comprise motion estimation means having at least two different operation modes and the result verification means have been arranged to select the operation mode of said motion estimation means.

According to one aspect of the present invention, there is provided a motion estimation system for a video coder comprising: means for receiving a video frame to be coded; a series of motion estimators of varying complexity, for estimating a motion vector field between the said received frame and a reference frame; and control means for selecting the subsequent motion estimator in the series only if a prediction error associated with the motion vector field estimated by the currently selected motion estimator exceeds a predetermined threshold.

The series of motion estimators may comprise a series of motion models, a series of minimisers, or a combination of both. For example, it may comprise a hierarchy of motion models in order of complexity (e.g zero motion model, translational motion model, affine motion model, and quadratic motion model). Alternatively, it may comprise a series of minimisers, for example for one particular model (e.g. for a linear model, the series of minimisers could be Quasi-Newton and Newton (proper and/or Taylor expanded). Another option is a combination of motion models and minimisers (e.g. such as that shown in FIG. 8 of the accompanying drawings).

The predetermined threshold may differ, at different stages of minimisation and/or for different models. (For example see FIG. 8 of the accompanying drawings).

The motion estimation system may further comprise means for smoothing the received frame. Such smoothing means may take the form of a series of low pass filters. Preferably, the control means selects the level of smoothing during minimisation depending on the change in prediction error, For example, if the change is below a threshold for a certain level of smoothing, then at least the next level of smoothing may be jumped. Alternatively, if the change is at, or above, the threshold, then the next level of smoothing may be selected.

There may also be provided a video coder comprising a motion estimation system according to the present invention.

According to another aspect of the present invention, there is provided a motion estimation method for coding a video frame, comprising: receiving a video frame to be coded; estimating a motion vector field between the said received frame and a reference frame, using a motion estimator from a series of motion estimators of varying complexity; determining whether a prediction error associated with the motion vector field estimated by the currently selected motion estimator exceeds a predetermined threshold and, only if so, selecting the subsequent motion estimator in the series.

BRIEF DESCRIPTION OF THE DRAWINGS

Embodiments of the present invention will now be described, by way of example, with reference to the accompanying drawings, of which.

DETAILED DESCRIPTION OF EMBODIMENTS OF THE INVENTION

Figure 4:
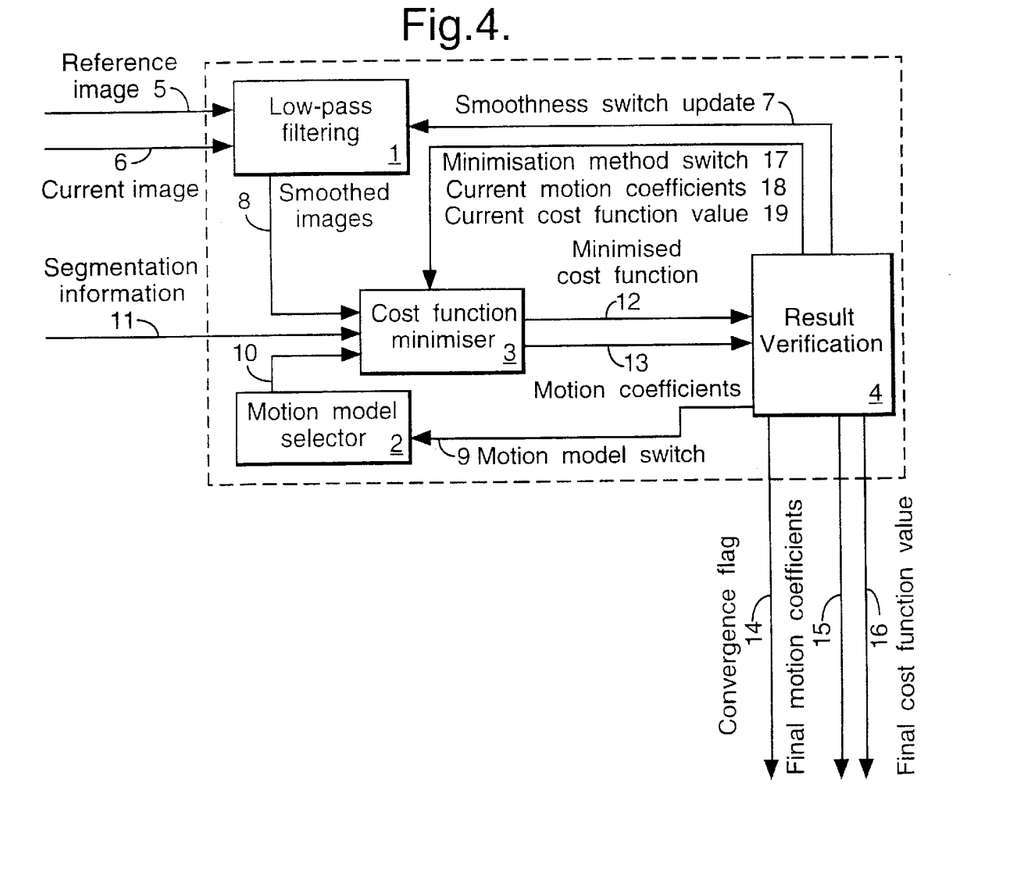
FIG. 4 illustrates a motion estimation system according to an embodiment of the invention.

A motion estimation system of a preferred embodiment of the present invention is shown in FIG. 4. It consists of four main building blocks, namely a low-pass filtering block 1, a motion model selector block 2, a cost function minimiser block 3 and a result verification block 4. Each of these blocks is described below.

The system works iteratively. At each iteration the motion model, the minimization method, and the amount of required low-pass filtering is determined. This decision is made in the result verification block 4.

Figure 5:
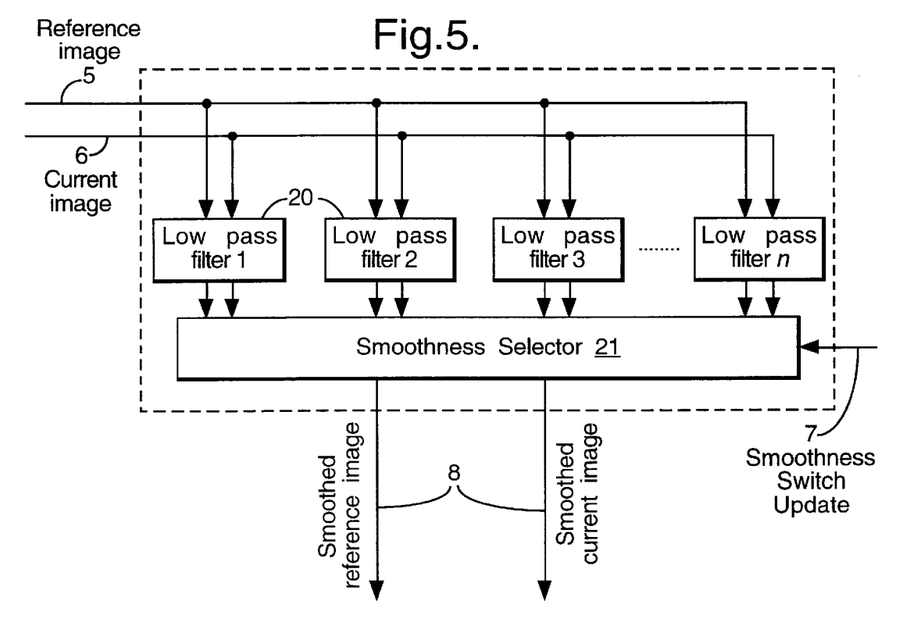
FIG. 5 illustrates the low pass filtering block shown in FIG. 4.

FIG. 5 is a block diagram of a preferred low-pass filtering block 1. The inputs to this block are the reference frame 5, the current frame 6, and the information about the required level of filtering (smoothness switch update 7).

The low-pass filtering block 1 consists of a bank 20 of low-pass filters and a multiplexer 21. The filters in the bank must be designed in such a way that the cut-off frequencies of low pass filter 1, low pass filter 2, . . . , low pass filter n form a decreasing sequence.

The multiplexer is in the form of a smoothness selector 21. The inputs to the smoothness selector 21 are reference frame 5 and current frame 6, and their low-pass filtered versions at various levels of smoothness. The smoothness switch update 7 chooses which image pair will be the output.

Figure 6:
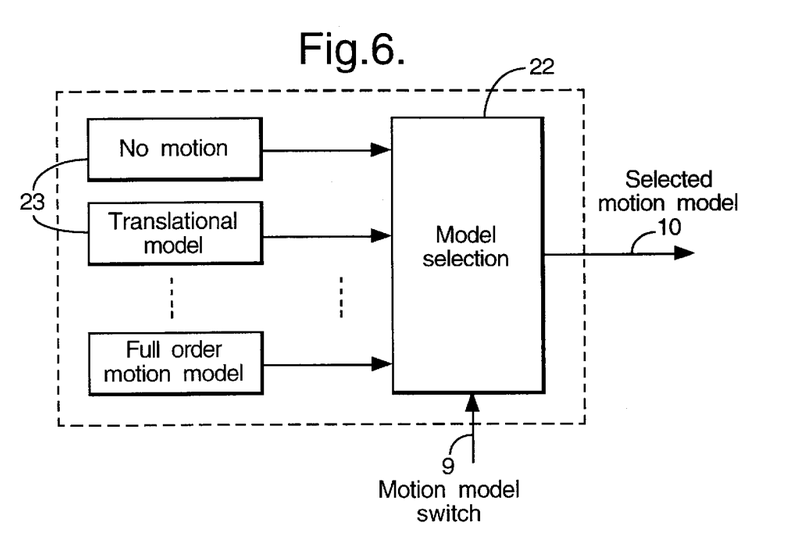
FIG. 6 is a block diagram of the motion model selector shown in FIG. 4.

FIG. 6 shows a preferred motion model selector block 2. The motion model selector block 2 is a motion model multiplexer. The input to this block is motion model switch signal 9.

Model selection block 22 is a multiplexer, which makes a selection among a bank 23 of motion models, via motion model switch signal 9. The motion models in the bank 23 vary in order of complexity. The order of complexity, or shortly order, refers to the number of basis functions used in representing the motion. There is a close relation between the order of complexity of the motion model and computational complexity: as the order of complexity of the motion model increases, the computational complexity of estimation of model coefficients increases. As a special case, there is a model 'no motion' for which all the motion coefficients are set to zero. The motion model in the bank with the highest order of complexity is named 'full order motion model'.

The motion models in the bank have a hierarchy: the basis function set of each motion model (except the full order motion model) is a subset of that of higher order models in the bank. Hence, any motion vector field represented by a motion model in the bank can also be represented by higher order models in the bank. This property can be used to initialize the motion coefficients for a certain motion model with the ones for lower order motion models. Given the motion coefficients for the lower order model, this initialization is done as follows: if the coefficient corresponds to a basis function which exists in the lower order model, set it to the value of the coefficient associated with the basis function in the lower order model. If the coefficient corresponds to a basis function which does not exist In the lower order model, set it to zero.

Figure 7:
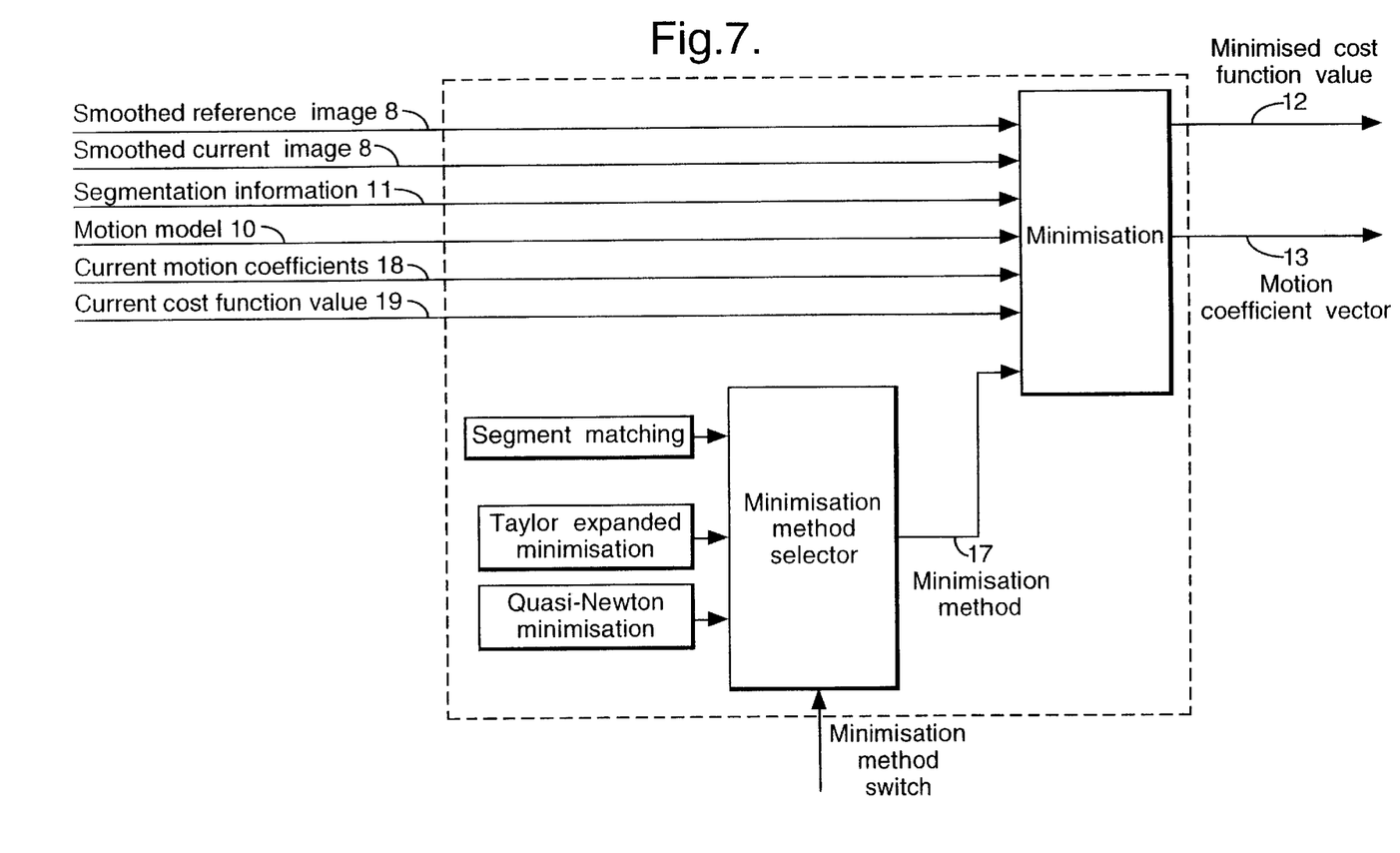
FIG. 7 is a block diagram of the cost function minimiser shown in FIG. 4.

FIG. 7 shows the block diagram of a preferred cost function minimizer 3. The cost function minimizer block 3 is the place where minimization of the cost function is actually performed.

The inputs to this block are smoothed reference and current image 8, segmentation information 11, motion model 10, current motion coefficients 18, current cost function value 19, and minimization method switch signal 17.

This cost function minimiser block 3 performs minimization by one of the methods in its bank. There are three methods in the bank, and the selection of the method is performed by minimization method switch signal 17. These three methods are segment matching 24, Taylor expanded minimisation 25 and Quasi-Newton minimisation 26, and are further described below.

Segment matching can be selected only for the translational motion model (6). The value of the cost function is calculated for the selected set of values of motion coefficients $a_0$ and $b_0$. The values of $a_0$ and $b_0$ which yield the smallest value of the prediction error are chosen as the solution.

Taylor expanded minimisation can be used for any motion model except 'no motion'. It uses the well-known Newton iteration step to minimize the value of the cost function. (R. Fletcher, "Practical Methods of Optimization", Second Edition, John Wiley & Sons, 1987, Chapter 3 and Chapter 6 gives an overview of Newton minimization). This step requires first and second derivatives of the cost function with respect to the motion coefficients. These derivatives are calculated by employing a Taylor expansion for the contribution of each pixel to the cost function.

This step is not computationally very costly, since it does not require multiple evaluations of the cost function. Quasi-Newton minimization is a well known iterative procedure which continues iterations until a convergence to a minimum is achieved (Again, see R. Fletcher, "Practical Methods of Optimization", Second Edition, John Wiley & Sons, 1987, Chapter 3 and Chapter 6).

It uses a similar quadratic approximation of the cost function as in Newton's method. The basic difference from Newton's method is that instead of calculating the second derivative matrix at each step, it uses a positive definite approximation of its inverse, and updates this approximation by simple computations at each step. It is a very robust and high performance technique. However, it is computationally costly for high order motion models.

The block outputs a minimised cost function value 12 and a motion coefficient vector 13.

Turning now to the result verification block 4 shown in FIG. 4, this controls the other blocks in the system by generating switch signals. These switch signals are smoothness switch update 7 (determining the smoothness level to be used in the current iteration), motion model switch 9 (determining the motion model to be used in the current iteration), and minimization method switch 17 (determining the minimization method to be used in the current iteration). Any combination of switch signals generated by this block has an underlying set of assumptions. The purpose of this block 4 is to find the strongest set of assumptions that is valid for the current state. Once the set of assumptions is determined, a new set of switch signals is generated, and new motion coefficients and a new cost function value result. By comparing these to the previous ones, the result verification block determines:

Whether new coefficients will be accepted (verified)

Whether the cost function reached an acceptably low value(termination decision)

If iterations will continue, what the next switch signals will be. These switch signals control other blocks in the system. So, determination of the switch signals practically means the decisions about the motion model, minimization method, and low pass filtering level to be used in the next iterations.

The result verification block 4 keeps 'current motion coefficients 18', which are the motion coefficients yielding the smallest value of the cost function so far, and a 'current cost function value 19' which is the smallest value of the cost function so far. If the iterations are continued, current motion coefficients and current cost function value are fed to cost function minimizer 3.

The generation of the new switching signals depending on the comparison of results can be done in numerous ways. A preferred way will be described below.

Upon convergence, a convergence flag signal 14 is set, current motion coefficients 18 are output as 'final motion coefficients 15', and current cost function value 19 is output as 'final cost function value 16'.

A major advantage of this invention over previously known solutions is its ability to estimate the motion of a region that minimizes the prediction error, while keeping the computational complexity low.

The result verification block 4 is a powerful tool for keeping the computational complexity of the system at a minimum. By context-dependent switching between techniques, this block allows high performance motion estimation, involving computationally complex techniques only when necessary.

The system can find motion coefficients of a segment for:

Any arbitrarily shaped segment

Any desired model of the motion field in the segment

Any meaningfully chosen cost function of the prediction error (mean square error, mean absolute error, rate-distortion lagranglan, etc.).

The system can be implemented in a variety of ways. For example, the following issues may vary:
1. different basis functions can be used in (4) and (5),
2. different cost functions can be selected as a measure of prediction error,
3. different types of low-pass filters can be used,
4. different methods can be used for segment matching,
5. different variants of Quasi-Newton and Newton minimization can be used,
6. different strategies can be used for result verification and method switching.

A preferred embodiment of the invention will now be described. In this embodiment, the motion field model used is the quadratic motion model and the cost function used is square prediction error. This cost function is given in (10).

Low pass filters in the bank 20 are obtained in this embodiment by cascading a kernel filter a number of times. 'low pass filter i' (i.e., i'th filter in the bank) is obtained by cascading the kernel filter i times. The kernel filter is a 3×3 linear filter with the following coefficients:

$$\frac{1}{24} \cdot \begin{pmatrix} 1 & 2 & 1 \\ 2 & 12 & 2 \\ 1 & 2 & 1 \end{pmatrix} \quad (11)$$

There are six low-pass filter blocks in the low-pass filtering block 1. So, seven image pairs (non-filtered+filtered 1, ... , 6 times) are input to the multiplexer 7.

In this preferred embodiment of the invention there are four motion models 23 in the motion model selector's bank: zero motion model, translational model (6), affine model (7), and quadratic model (8). The quadratic model is the full order motion model, i.e. it has the highest order of complexity among the models in the bank.

In the cost function minimiser of this preferred embodiment, the segment matching 24 performed is 'full-pel segment matching with full search'. This operation requires testing all integer-valued motion coefficient pairs in a certain range to find the pair minimizing the cost function.

With regard to the Taylor expanded minimisation, first order Taylor expansion of the reconstructed reference frame $R_n(.)$ is used. Let $a_k$ denote the vector formed by the motion coefficients, and let $a_k^c$ denote the current value of $a_k$ which is an input to the minimizer. Given $a_k^c$, the goal is to find the new value of $a_k$ so as to minimize the value of the coast function. The Taylor expansion is done around $$x^c = x + \Delta x(a_k^c, x, y) \quad y^c = y + \Delta y(a_k^c, x, y) \quad (12)$$

In the frame coordinate space yielding $$R_n(x + \Delta x(a_k, x, y), y + \Delta y(a_k, x, y)) \approx \quad (13)$$
$$R_n(x^c, y^c) + \frac{\partial R_n(x^c, y^c)}{\partial x}(\Delta x(a_k, x, y) - \Delta x(a_k^c, x, y)) +$$
$$\frac{\partial R_n(x^c, y^c)}{\partial y}(\Delta y(a_k, x, y) - \Delta y(a_k^c, x, y))$$

Now the resulting coefficients $a_k$ can be obtained as the solution of the overdetermined system of linear equations:

$$E_k a_k = y_k \quad (14)$$

Matrix $E_k$ is given by $$E_k = \begin{bmatrix} e_1(x_1, y_1) & e_2(x_1, y_1) & \cdots & e_{12}(x_1, y_1) \\ e_1(x_2, y_2) & e_2(x_2, y_2) & \cdots & e_{12}(x_2, y_2) \\ \vdots & \vdots & & \vdots \\ e_1(x_p, y_p) & e_2(x_p, y_p) & \cdots & e_{12}(x_p, y_p) \end{bmatrix} \quad (15)$$

where P is the number of pixels in the segment, $(x_i, y_i)$ are all the pixel coordinates in the segment ordered arbitrarily and $$e_j(x_i, y_i) = \begin{cases} f_j(x_i, y_i) \frac{\partial R_n(x_i^c, y_i^c)}{\partial x} & j = 1, 2, \ldots, 6 \\ f_{j-6}(x_i, y_i) \frac{\partial R_n(x_i^c, y_i^c)}{\partial y} & j = 7, \ldots, 12 \end{cases} \quad (16)$$

Vector $y_k$ is given by $$y_k = \begin{bmatrix} I_n(x_1, y_1) + \frac{\partial R_n(x_1^c, y_1^c)}{\partial x} \Delta x(a_k^c, x_1, y_1) + \frac{\partial R_n(x_1^c, y_1^c)}{\partial y} \Delta y(a_k^c, x_1, y_1) - R_n(x_1^c, y_1^c) \\ I_n(x_2, y_2) + \frac{\partial R_n(x_2^c, y_2^c)}{\partial x} \Delta x(a_k^c, x_2, y_2) + \frac{\partial R_n(x_2^c, y_2^c)}{\partial y} \Delta y(a_k^c, x_2, y_2) - R_n(x_2^c, y_2^c) \\ I_n(x_p, y_p) + \frac{\partial R_n(x_p^c, y_p^c)}{\partial x} \Delta x(a_k^c, x_p, y_p) + \frac{\partial R_n(x_p^c, y_p^c)}{\partial y} \Delta y(a_k^c, x_p, y_1) - R_n(x_p^c, y_p^c) \end{bmatrix} \quad (17)$$

In this preferred embodiment (14) is solved by Cholesky decomposition (See W. H. Press, S. A. Teukolsky, W. T. Vetterling, and B. P. Flannery, "Numerical Recipes in C", Second Edition, Cambridge University Press, 1992, pp. 96–98).

The Quasi-Newton minimisation 26 used in this preferred embodiment is known as 'Quasi-Newton minimization with BFGS update formula and inexact line minimization' (See R. Fletcher, "Practical Methods of Optimization", Second Edition, John Wiley & Sons, 1987, Chapter 3 and Chapter 6)

Figure 8:
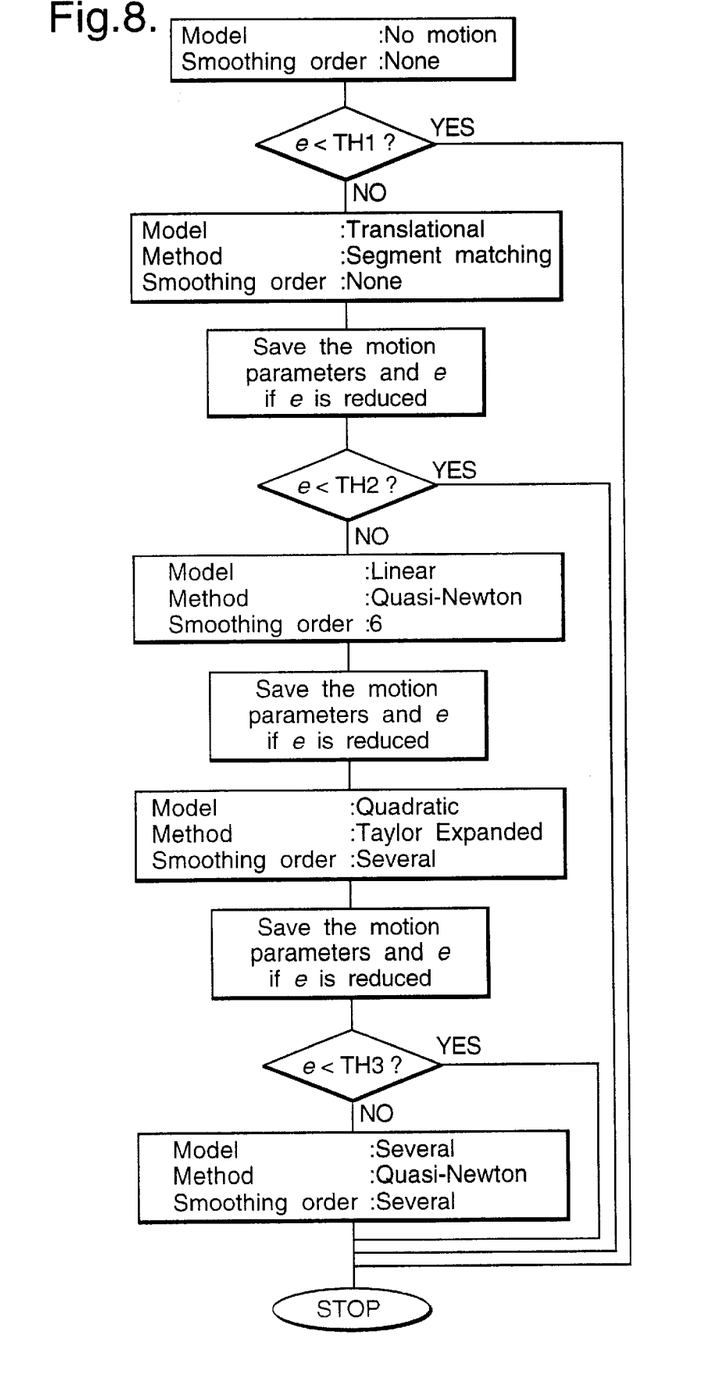
FIG. 8 is a flow diagram of a preferred implementation of the result verification block shown in FIG. 4.

FIG. 8 shows the flow diagram of the operation of the result verification block 4 of this preferred embodiment. First step is switching the smoothness level to 0 and model to 'Zero motion'. If the resulting cost function is below a specified threshold (named 'TH1' in the diagram), the search is terminated with zero motion coefficients.

If the value of the cost function is larger or equal to TH1, the next assumption is that translational model can approximate the actual motion field. Following this assumption, smoothness level is kept at 0, model is switched to 'translational', and method to 'segment matching'. If the cost function resulting from this step is below another specified threshold (named TH2 in the diagram), there is no need to continue the search. Assumption is verified, and the resulting motion coefficients are used to form the output in quadratic motion model. This is done by setting the values of $a_0$ and $b_0$ in (8) to the values computed by segment matching, and setting the other coefficients to zero.

If the threshold is exceeded, the next assumptions are 'linear motion model satisfactorily approximates the motion field' and 'smoothing the image 6 times will erase the local minima'. Since the number of coefficients is not very high for the linear motion model, and since convergence is easier for smoothed images, Quasi-Newton minimization is used. Motion coefficients are initialized with the resulting motion coefficients from the segment matching. This is done by setting the values of $a_0$ and $b_0$ in (7) to the values computed by segment matching, and setting the other coefficients to zero. Finally the model is switched to linear smoothness level to 6, and method to Quasi-Newton.

The resulting motion coefficients are applied to motion compensation with non-smoothed images, and corresponding cost function is evaluated. If the value of this cost function is less than that with zero motion, the motion coefficients and the cost function value are saved.

Then, a series of Taylor expanded minimizations are applied. Each step in the series uses quadratic motion model as the model, and Taylor expanded minimization as the method.

In this stage, starting from a smoothness level of 4, smoothness level is gradually decreased to zero. Because of the approximative nature of the Taylor expansion the actual minimum of the error function can be found only after a set of successive minimizations and every time updating the Taylor expansion for the motion vector field yielding the minimum cost function so far. However the characteristics of the regions are very different. In some cases the minimum can be found with just a few steps, while in some cases it needs many steps.

Figure 9:
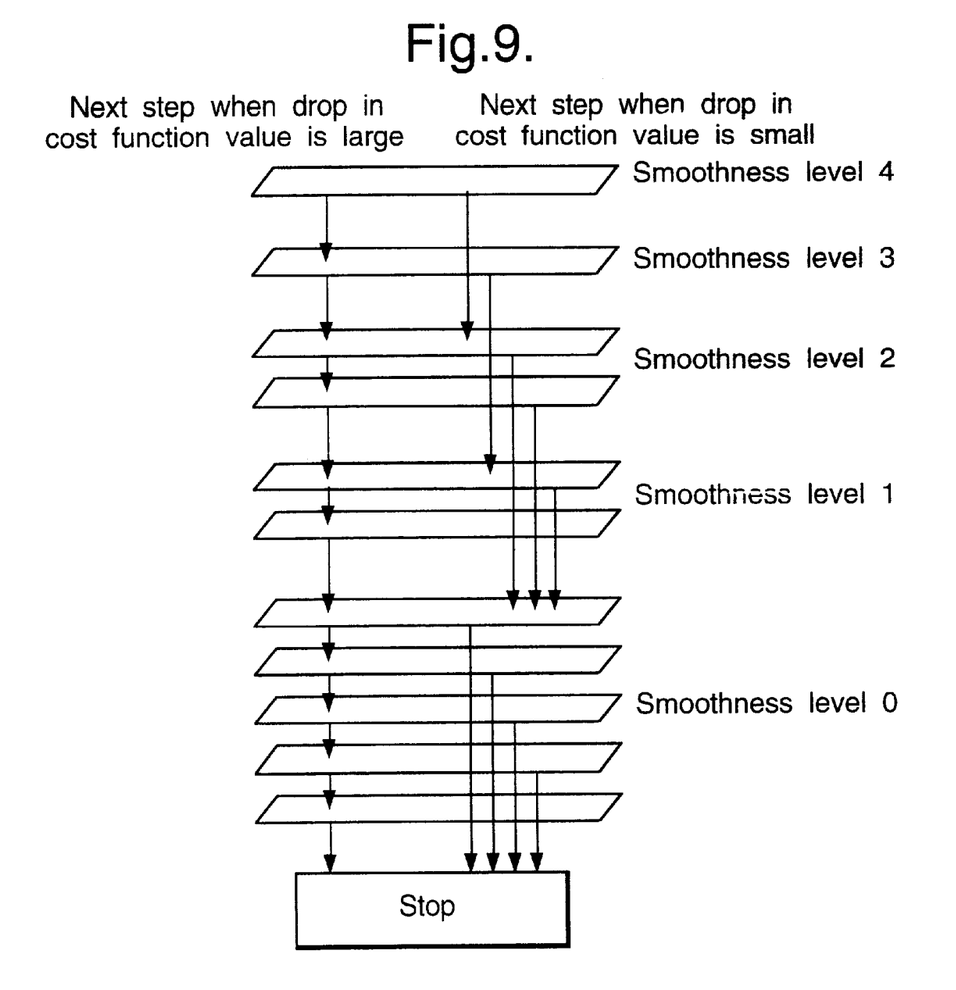
FIG. 9 is a flow diagram of a Taylor expanded minimisation stage according to an embodiment of the present invention.

A structure such as that shown in FIG. 9 is found to be an efficient solution to the problem. The principle is to skip over certain minimization steps if the drop in cost function value is not large, The strategy is as follows: after each minimization step, the resultant value of the cost function (on non-smoothed image domain) is compared to the current cost function value. If the resulting value is less than the lowest value so far, the resulting motion coefficients and the value of the cost function are saved. If the drop in cost function value is below a threshold, the minimization steps with the same smoothness and the one less are skipped. This continues until the steps with non-smoothed images are reached. For non-smoothed images a different threshold is used and the Taylor expanded minimizations stage is terminated when the reduction in cost function value is below this threshold. This stage is also terminated if the maximum number of five minimizations with non-smoothed images is reached.

After the Taylor expanded minimization stages, next step is comparing the current cost function value to yet another threshold (named TH3 in FIG. 8). If the current cost function value is less than TH3, search is terminated. Otherwise, Quasi-Newton minimization stages are entered.

In this phase motion coefficients are initialized with the coefficients obtained from segment matching and four Quasi-Newton minimization stages are performed:

Translational model, smoothness level 4
Linear model, smoothness level 2
Quadratic model, smoothness level 2
Quadratic model, Smoothness level 0

After each minimization stage, the value of the cost function (on non-smoothed image domain) is compared to the smallest value so far. If decrease in cost function value is obtained, the motion coefficients and the value of the cost function are saved.

When these stages are completed, result verification block 4 terminates the search, assigning the smallest cost function value obtained as the final cost function value and the corresponding motion coefficients as the final motion coefficients.

As outlined above, the system for motion estimation according to the present invention achieves motion estimation with significantly less prediction error than that of previous solutions, while keeping the computational complexity at a statistically low level. This is achieved by the arrangement enabling the dynamic switching between statistically valid assumptions varying in strength, via assumption verification at each iteration.

Further, the present invention specifically provides an improved system for motion estimation of an image segment, using a polynomial motion vector field model. Motion estimation is an element of video coding using motion compensated prediction. The system finds motion coefficients which yield lower prediction error than the prior art solutions, while keeping the computational complexity low. This low prediction error results in better performance in terms of video compression. The low prediction error is achieved by incorporating the general characteristics of image data and motion into a combination of well known function minimization techniques.

From the foregoing description it will be evident to a person skilled in the art that various modifications can be made within the scope of the claims.

What is claimed is:

1. (Three times amended) A motion estimation system for a video coder comprising:
    means for receiving a video frame to be coded;
    a series of motion estimators of varying complexity for estimating a motion vector field between the received frame and a reference frame; and
    control means for selecting successive ones of said estimators, individually, beginning with an estimator of said series having a lesser complexity and progressing toward an estimator of said series having a greater complexity, said control means being operative to select a subsequent motion estimator in the series only if a prediction error associated with the motion vector field estimated by a currently selected motion estimator exceeds a predetermined threshold;
    wherein said series of motion estimators is drawn from a group of motion estimators including: a motion estimator comprising a minimizer, a motion estimator comprising a zero motion model, a motion estimator comprising a translational motion model which is more complex than the motion estimator comprising the zero motion model, a motion estimator comprising an affine motion model which is more complex than the motion estimator comprising the translational motion model, and a motion estimator comprising a quadratic motion model which is more complex than the motion estimator comprising the affine motion model.

2. A motion estimation system as claimed in claim 1, wherein the series of motion estimators comprises a series of motion models.

3. A motion estimation system as claimed in claim 2, wherein the motion models are polynomial motion models.

4. A motion estimation system as claimed in claim 2, wherein the series of motion models comprise a hierarchy including a translational motion model, a simplified linear model and a complete linear model.

5. A motion estimation system as claimed in claim 2, wherein the series of motion models comprises any one, or any combination of, a zero motion model, a translational motion model, an affine motion model and a quadratic motion model.

6. A motion estimation system as claimed in claim 1, wherein the series of motion estimators comprises a series of minimizers.

7. A motion estimation system as claimed in claim 6, wherein the series of minimizers comprises a segment matching minimizer, a Newton minimizer and a Quasi-Newton minimizer.

8. A motion estimation system as claimed in claim 6, wherein the series of minimizers comprises a full search minimizer and/or a Taylor expanded minimizer.

9. A motion estimation system as claimed in claim 1 further comprising means for smoothing the received frame and for forwarding the smoothed frame to the series of motion estimators.

10. A motion estimation system as claimed in claim 9, wherein the smoothing means comprises a series of low pass filters.

11. A motion estimation system as claimed in claim 9, wherein the control means selects the level of smoothing during minimization depending on the change in prediction error.

12. A video coder comprising a motion estimation system as claimed in claim 1.

13. A motion estimation method for coding a video frame, comprising steps of:

receiving a video frame to be coded;

estimating a motion vector field between the received frame and a reference frame, using a motion estimator from a series of motion estimators of varying complexity;

determining whether a prediction error associated with the motion vector field estimated by a currently selected motion estimator exceeds a predetermined threshold and, only if so, selecting a subsequent motion estimator in the series;

wherein, in said selecting step, there is a selecting of successive ones of said estimators, individually, beginning with an estimator of said series having a lesser complexity and progressing toward an estimator of said series having a greater complexity; and wherein said series of motion estimators is drawn from a group of motion estimators including: a motion estimator comprising a minimizer, a motion estimator comprising a zero motion model, a motion estimator comprising a translational motion model which is more complex than the motion estimator comprising the zero motion model, a motion estimator comprising an affine motion model which is more complex than the motion estimator comprising the translational motion model, and a motion estimator comprising a quadratic motion model which is more complex than the motion estimator comprising the affine motion model.

14. A motion estimation system for a video coder comprising:

means for receiving a video frame to be coded;

a plurality of motion estimators of varying complexity to be operated sequentially in a sequence for estimating a motion vector field between the received frame and a reference frame;

control means, responsive to prediction errors of motion vector fields associated with respective ones of said motion estimators, for making sequential selections for operation of individual ones of said motion estimators in said sequence, said control means calling for operation of a further one of said motion estimators in said sequence only if a prediction error estimated by a currently selected motion estimator exceeds a predetermined threshold;

wherein, in said sequential selections, there is a selecting of successive ones of said estimators, individually, beginning with an estimator of said sequence having a lesser complexity and progressing toward an estimator of said sequence having a greater complexity; and wherein said sequence of motion estimators is drawn from a group of motion estimators including: a motion estimator comprising a minimizer, a motion estimator comprising a zero motion model, a motion estimator comprising a translational motion model which is more complex than the motion estimator comprising the zero motion model, a motion estimator comprising an affine motion model which is more complex than the motion estimator comprising the translational motion model, and a motion estimator comprising a quadratic motion model which is more complex than the motion estimator comprising the affine motion model.

15. A motion estimator according to claim 14 wherein an individual one of said motion estimators does not enter into operation until activated by said control means.

16. A motion estimation method for coding a video frame, comprising steps of:

receiving a video frame to be coded;

operating a plurality of motion estimators of varying complexity sequentially in a sequence for estimating a motion vector field between the received frame and a reference frame, operation of an individual one of said motion estimators being accomplished by a step of estimating a motion vector field between the received frame and a reference frame;

selecting individual ones of said motion estimators for operation in said sequence, individually, beginning with an estimator of said sequence having a lesser complexity and progressing toward an estimator of said sequence having a greater complexity;

upon operation of a currently selected motion estimator in said sequence, providing a determination of whether a prediction error associated with the motion vector field estimated by the currently selected motion estimator exceeds a predetermined threshold;

wherein, in said selecting step, there is a selection of a further one of said motion estimators for operation in said sequence only if the prediction error associated with the motion vector field estimated by the currently selected motion estimator exceeds the predetermined threshold; and wherein said sequence of motion estimators is drawn from a group of motion estimators including: a motion estimator comprising a minimizer, a motion estimator comprising a zero motion model, a motion estimator comprising a translational motion model which is more complex than the motion estimator comprising the zero motion model, a motion estimator comprising an affine motion model which is more complex than the motion estimator comprising the translational motion model, and a motion estimator comprising a quadratic motion model which is more complex than the motion estimator comprising the affine motion model.

17. A method according to claim 16 wherein there is no operation of a motion detector until said motion detector has been selected in said selection step.

* * * * *